United States Patent
Shannon

(10) Patent No.: US 6,276,797 B1
(45) Date of Patent: Aug. 21, 2001

(54) ARTICLE TRANSFER METHOD

(75) Inventor: John H. Shannon, Hamlin, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/711,603

(22) Filed: Nov. 13, 2000

Related U.S. Application Data

(60) Provisional application No. 60/166,775, filed on Nov. 22, 1999.

(51) Int. Cl.[7] ............................................. G02C 7/04
(52) U.S. Cl. ............................................. 351/160 R
(58) Field of Search .................. 351/159, 160 R, 351/161, 162, 160 H, 177; 264/2.1, 1.1, 500, 310; 252/187.21; 206/5.1, 205; 134/137, 901; 425/412, 808; 414/755

(56) References Cited

U.S. PATENT DOCUMENTS

| | | | |
|---|---|---|---|
| 3,874,124 | 4/1975 | Morgan | 51/125 |
| 4,636,338 * | 1/1987 | Neefe | 264/2.1 |
| 5,143,660 | 9/1992 | Hamilton | 264/1.4 |
| 5,336,434 * | 8/1994 | Parker et al. | 252/187.21 |
| 5,347,896 | 9/1994 | Jones | 82/125 |
| 5,378,412 | 1/1995 | Smith | 264/2.1 |
| 5,407,062 | 4/1995 | Shannon | 206/5.1 |
| 5,466,147 | 11/1995 | Appleton | 425/412 |
| 5,503,515 | 4/1996 | Moorehead | 414/755 |
| 5,561,970 | 10/1996 | Edie | 53/473 |
| 5,573,108 | 11/1996 | Hamilton | 206/5.1 |
| 5,969,793 | 10/1999 | Dobner | 351/247 |

* cited by examiner

Primary Examiner—George Manuel
(74) Attorney, Agent, or Firm—Katherine McGuire

(57) ABSTRACT

A method for transferring an article from a first receptacle to a second receptacle and, optionally, changing the orientation of the article. A contact lens is initially concave side-down within a well containing solution. By freezing the solution containing the lens-shaped article, the frozen solution with the lens can be conveniently transferred between stations without harming the lens. If necessary, the vessel and lens can be inverted as a unit such that the concave surface of the lens is side-up. The frozen solution melts into a second receptacle well with the lens transferring into the second receptacle. The lens remains concave surface up in the second well.

10 Claims, 4 Drawing Sheets

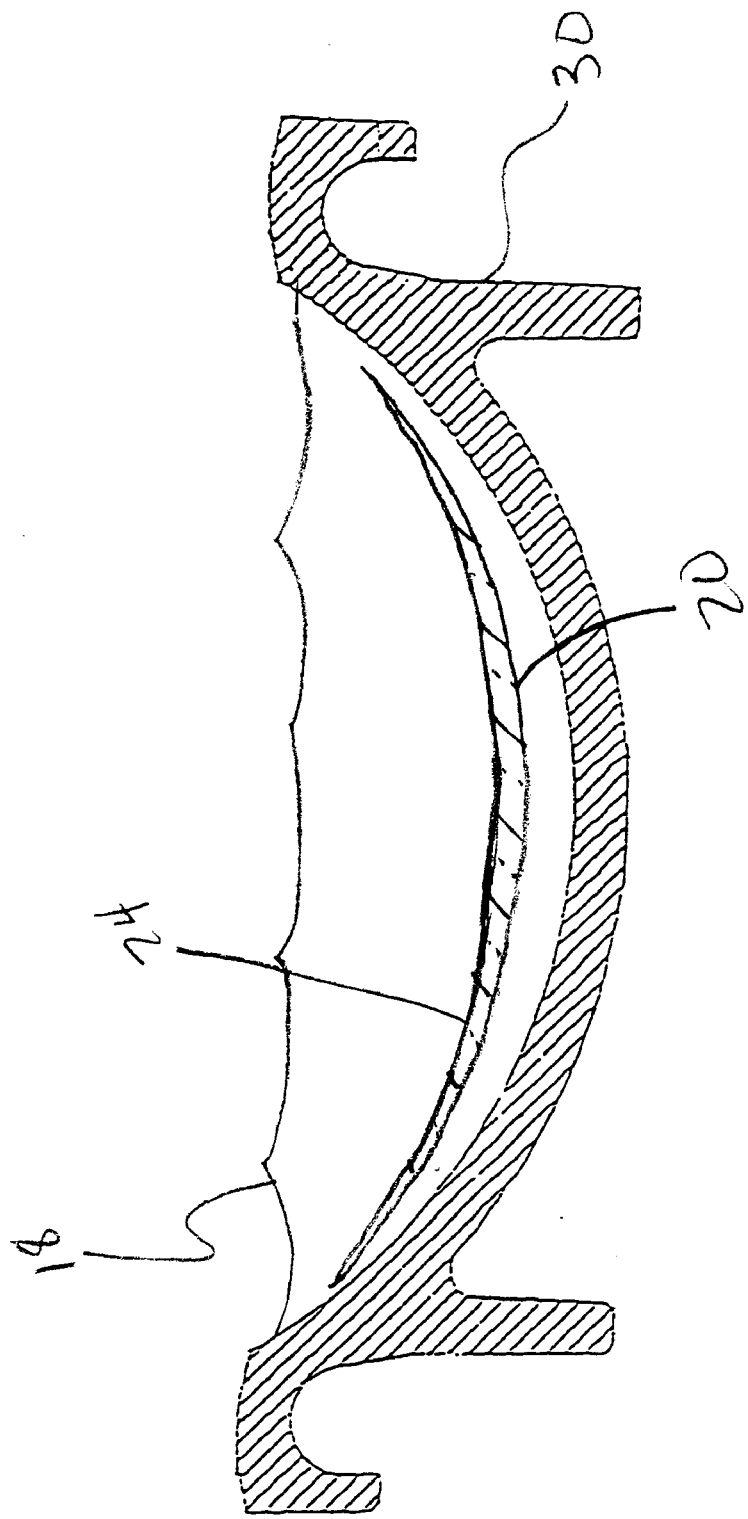

ARTICLE TRANSFER METHOD

This application claims benefit of 60/166,775 filed Nov. 22, 1999.

BACKGROUND OF THE INVENTION

The present invention relates to an article handling method for an in-line manufacturing process. More specifically, the invention is especially useful for transferring delicate materials such as hydrated contact lenses, for example, between separate manufacture processing steps.

Small, delicate work pieces such as contact lenses are difficult to transfer through multiple stages of a manufacturing process. In the dry state, a contact lens is fragile and prone to scratching, cracking and breaking. In a hydrated state, a contact lens tears easily and is difficult to handle as the lens is extremely pliable. Manipulating a contact lens into a desired orientation, such as having the concave side of the lens facing upward or toward a particular direction, can be difficult. Usually, this orientation must be done manually and requires a laborious process, often involving human effort. A worker may have to turn the lens with a pair of tweezers. Inevitably, whether the lens is dry or hydrated, the tweezers damage the lens. The worker may also be exposed to repetitive motions, contributing to injuries. It has therefore been desirable to automate as much of the contact lens manufacturing process as possible.

At certain stages of the manufacturing process, the lens is dry. U.S. Pat. No. 5,969,793 (Dobner, assigned to Bausch & Lomb Incorporated) discloses a method and apparatus for transferring a dry lens between different stages of a manufacturing process. The lens remains centered during the transfer. Once the lens is transferred to a support, it can now undergo processing such as edging which requires the lens to be centered.

U.S. Pat. No. 5,503,515 (Moorehead, assigned to Bausch & Lomb Incorporated) discloses an apparatus and method for inverting contact lenses while on a tray. The tray includes a plurality of small, spaced perforations having diameters substantially smaller than any one of the lenses. A plurality of lenses are placed convex side-up on the tray such that the lenses are positioned over at least one perforation. A source of air is located below the tray and directs a stream of air upwardly so as to invert the lenses, resulting in concave side-up lenses.

After hydration, handling or transferring a wet contact lens presents additional technical problems. It is perhaps even more difficult to manipulate a wet soft contact lens than a dry lens in an automated fashion.

U.S. Pat. No. 5,561,970 (Edie et al.) discloses a robotic lens transfer device which utilizes vacuum within an effector end having a transfer tip. The transfer tip has a series of bore openings which are radially oriented. The transfer tip is positioned over a hydration cup and a vacuum is applied prior to lens pickup. The tip is lowered into close proximity to the lens and the lens is picked up from the mold. The tip is then positioned over a blister package and by applying air blow-off, the lens is deposited into the package. The lens as placed in the package is in the original orientation as it was in the hydration cup.

Some mold parts are utilized as part of the packaging. For example, U.S. Pat. Nos. 5,143,660 and 5,573,108 (both to Hamilton et al.) discloses a contact lens package comprising a mold part. The lens is cast between a male mold surface in a first mold part and a female mold surface in a second mold part. The mold is opened to expose the cast lens while supported on the male mold surface. The lens is sealed in a package by sealing a cover member onto first mold part. These types of process require little manipulation of lens.

SUMMARY OF THE INVENTION

This invention provides a method for handling articles, particularly small delicate articles, between stations of a manufacturing process. In particular, the invention provides a method for transferring a lens-shaped article from a first receptacle to a second receptacle, while also changing the orientation of the article.

This invention is particularly useful when transferring a contact lens which has been formed in a male or posterior mold into a blister package with a hemispherical well. While in the posterior mold, the lens is convex side-up. Because the well of the blister package has a hemispherical shape, the desired orientation of the lens is concave side-up.

BRIEF DESCRIPTION OF THE DRAWINGS

FIG. 4 is a cross-sectional elevational view of a contact lens package containing a contact lens and solution, the contact lens which is now concave side-up.

DETAILED DESCRIPTION OF THE INVENTION

Figure 1:
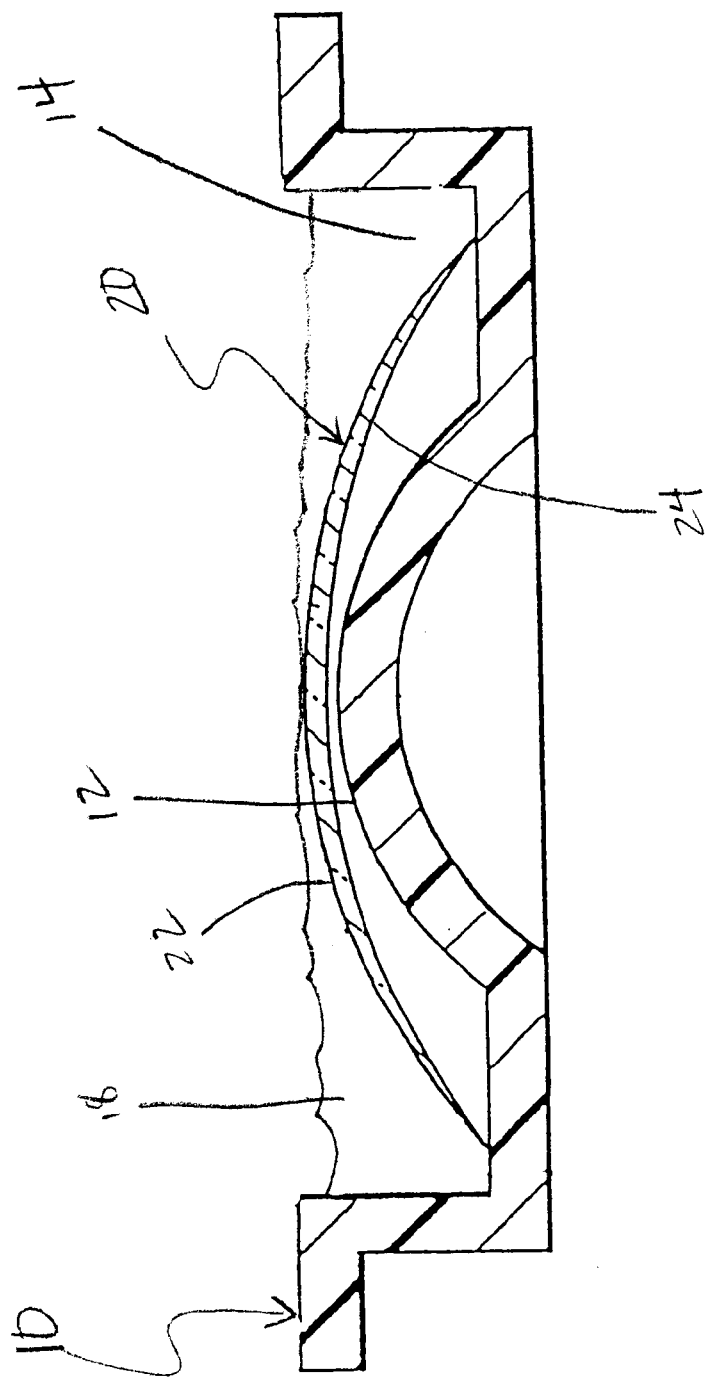
FIG. 1 is a cross-sectional elevational view of a posterior mold containing hydration or wetting solution and a contact lens, the contact lens being convex side-up.

While the following discussion illustrates the invention with respect to the handling of a contact lens, the present invention is applicable to handling any delicate article.

Referring now to the drawing, there is seen in the various Figures a contact lens 20 which requires transfer from a mold vessel to a packaging vessel. The inventive material handling method may also be used to alter the orientation of the article as it is transferred between stations, as discussed more fully below.

Cast molding is a popular method for making contact lenses. In this method, monomer is placed between anterior and posterior mold sections and cured to form the lens. The molds are de-coupled with the lens remaining in one mold section. In the present invention, the lens is preferably retained in the posterior mold section. The convex lens surface faces away from the posterior the mold section.

After processing, including surface treatment, the lens may be extracted and/or hydrated while still in the posterior mold section Hydrating the lens aids in releasing the lens from the mold.

FIG. 1 shows posterior mold section 10 containing contact lens 20 after de-coupling or separation from the anterior mold section (not shown). Contact lens 20 has a convex anterior surface 22 and concave posterior surface 24. Posterior surface 24 is formed by and thus lies adjacent to convex mold surface 12.

Solution 18 is added to well 14 of mold 10 in an amount sufficient to cover lens 20. Solution 18 may be any hydrating or extracting solution commonly used in contact lens processing. Examples of hydrating solutions include aqueous solutions with various surfactants and alcohols. Alternately, the lens hydration fluid may be discarded after hydration and replaced with a packaging solution. Examples of packaging solutions include isotonic buffered and unbuffered saline solutions. Common buffers include borate, phosphate and citrate buffers.

Hydrating and packaging solutions typically have lower freezing points than water. Solutions for treating, rinsing or storing contact lenses are typically isotonic with respect to the fluids of the human eye. Examples of suitable tonicity adjusting agents include sodium and potassium chloride, dextrose, and calcium and magnesium chloride. The solutions may also include buffering agents, surfactants, antimicrobial agents, and chelating and/or sequestering agents. Furthermore, the solution preferably has a pH of between 6 and 8.

Figure 2:
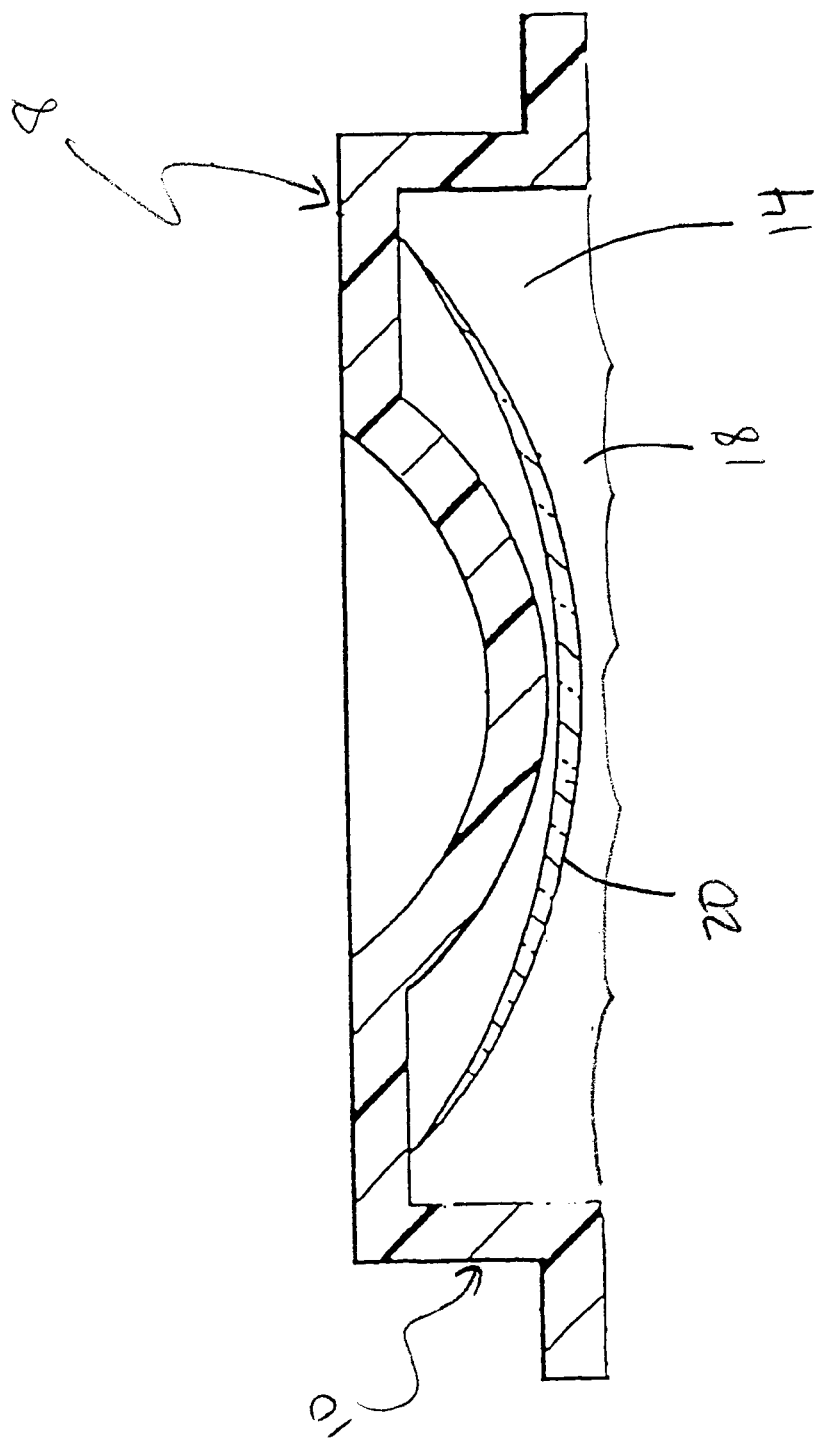
FIG. 2 is a cross-sectional elevational view of a posterior mold containing frozen solution and a contact lens.

After lens 20 has been fully hydrated, it swells and releases from mold surface 12. According to the method of the present invention, solution 18 is changed to a substantially solid state, preferably by freezing solution 18. This secures lens 20 in a stationary position within well 14. Solidifying solution 18 allows mold 10 to be inverted without lens 20 being dislodged from well 14. This is shown in FIG. 2. In the preferred embodiment, solution 18 containing lens 20 is frozen. This may be accomplished by placing the transfer assembly 8 onto a tray and placing into a freezer compartment, for example (not shown) or freezing transfer assembly 8 in-line.

Figure 3:
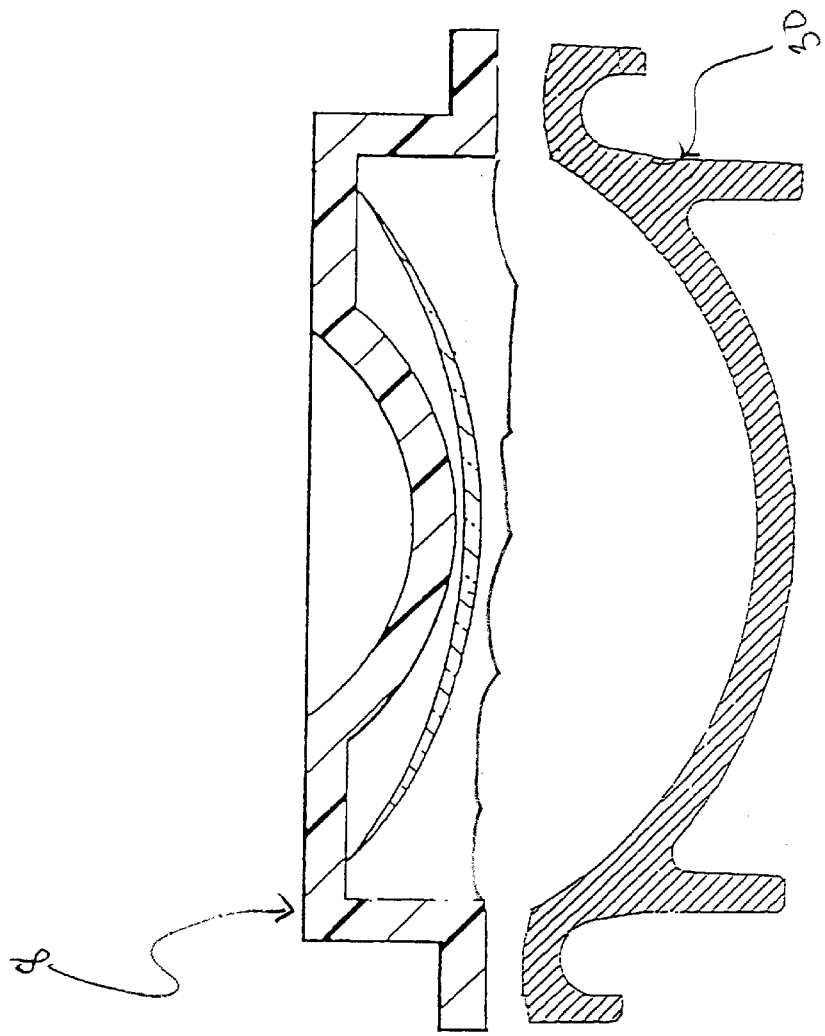
FIG. 3 is a cross-sectional elevational view of a posterior mold positioned over a package, the posterior mold contains a contact lens within the solid, frozen solution.

Once frozen, the assembly 8 may be inverted and placed onto package 30. While the preferred package is hemispherical as shown in FIG. 3, any type of packaging may be used, including blister packaging. Examples of alternate packaging include glass vials, mold halves and other types of containers.

The transfer assembly 8 may be allowed to thaw at room temperature or heat may be applied to help thaw solution 18. Once solution 18 has sufficiently thawed, solution 18 and lens 20 will simply drop into package 30. This can be seen in FIG. 4. Concave surface 24 of lens 20 is now concave side-up in package 30 as desired. It is noted that it is not required that solution 38 be completely thawed for solution 18 and lens 20 to be transferred into package 30. Additionally, partially thawed solution 18 and lens 20 may be mechanically transferred into package 30. Package 30 may subsequently be sealed for shipping to the consumer, for example, with any foil type lidstock commonly used in blister packaging. Upon use by the consumer, lens 20 is now easily removed from well 8 of package 30.

Various embodiments of the present invention are evident. As previously mentioned, any delicate or difficult to handle articles including contact lens-shaped articles may be transferred between any stations. This invention may also be used in the transferring of lenses while also changing lens orientation. Other variations and embodiments will be evident to one skilled in the art.

What is claimed is:

1. A method of transferring a lens from a first station to a second station, said lens including a concave surface and a convex surface, said first station including a well for containing said lens and a fluid contained within said well, and said second station including means for receiving said lens, said method comprising:
    a) causing said fluid to change phase into a solid with said lens encased within said solid;
    b) placing said solid with said lens therein above said second station; and
    c) changing or at least partially changing the phase of said solid back to said fluid thereby causing said lens to freely drop to said second station.

2. The method of claim 1, wherein the orientation of said concave and convex surfaces are reversed upon said lens dropping to said second station.

3. The method of claim 1, wherein said fluid is saline.

4. The method of claim 1, wherein said fluid is borate buffered saline.

5. The method of claim 1, wherein said fluid is frozen into said solid in step 1(*a*), and is thawed back into said fluid in step 1(*c*).

6. The method of claim 1, wherein said lens is a soft contact lens.

7. The method of claim 1, wherein said first station is a contact lens forming mold section used for cast-molding said lens.

8. The method of claim 1, wherein said second station is a contact lens package.

9. A method of transferring an article from a first station to a second station, said first station including a well for containing said article and a fluid contained within said well, and said second station including means for receiving said article, said method comprising:
    a) causing said fluid to change phase into a solid with said article encased within said solid;
    b) placing said solid with said article above said second station; and
    c) changing the phase of said solid back to said fluid thereby causing said article to freely drop to said second station.

10. A method of transferring an article from a first station to a second station, said first station including a well for containing said article and a fluid contained within said well, and said second station including means for receiving said article, said method comprising:
    a) causing said fluid to change phase into a solid with said article encased within said solid;
    b) placing said solid with said article above said second station; and
    c) partially changing the phase of said solid such that said partial solid with said article encased is transferable into said second station.

\* \* \* \* \*